C. HINMAN.
Animal Pokes.

No. 139,893. Patented June 17, 1873.

Witnesses.
Wm Howard
H. L. Perrine

Inventor.
Curtis Hinman
By Daniel Breed, Atty

UNITED STATES PATENT OFFICE.

CURTIS HINMAN, OF AKRON, OHIO.

IMPROVEMENT IN ANIMAL-POKES.

Specification forming part of Letters Patent No. 139,893, dated June 17, 1873; application filed March 8, 1873.

*To all whom it may concern:*

Be it known that I, CURTIS HINMAN, of Akron, in the county of Summit and State of Ohio, have invented certain new and useful Improvements in Animal-Pokes, of which the following is a specification:

My improvement relates to that class of animal-pokes in which spikes are used to prevent the horse or other animal from thrusting the spear against the fence.

My invention consists in a novel construction and arrangement of the metallic fork, guard, and spring, in combination with the spear and yoke. In the accompanying drawings—

Figure 1:
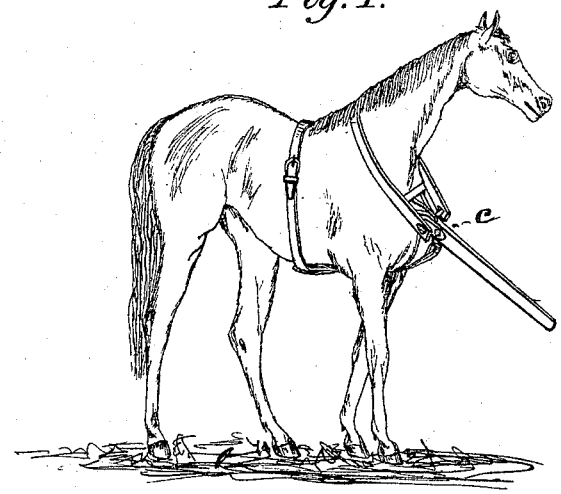
Figure 2:
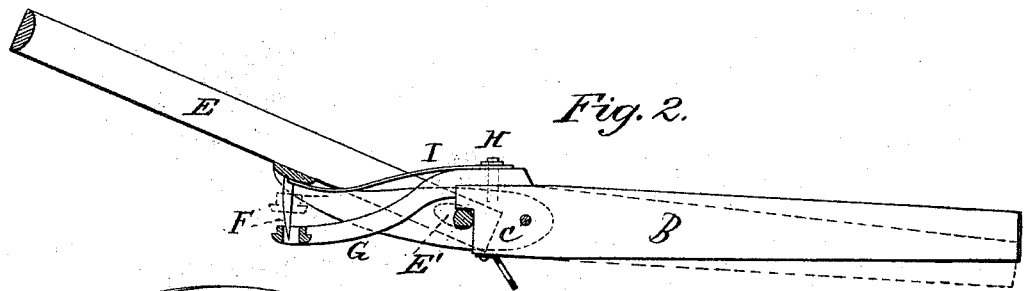
Figure 3:
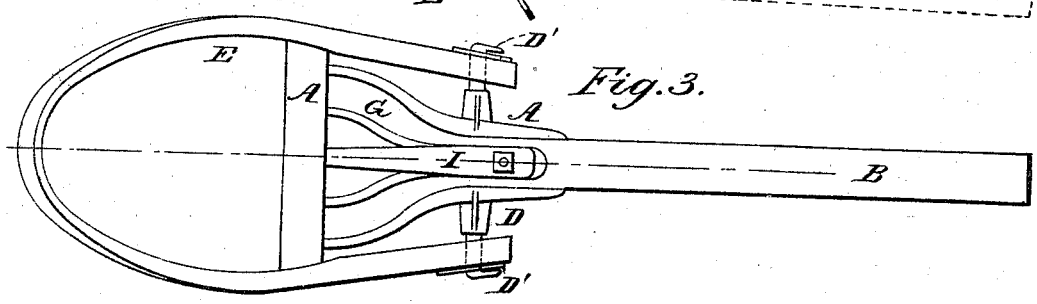

Figure 1 represents my new animal-poke upon the horse. Fig. 2 is a side view of the poke, partly in vertical section. Fig. 3 is a top view of same.

In the construction of my improved animal-poke the fork or casting A, is pivoted to the spear B, at C, Fig. 2, so as to have a slight motion when the animal thrusts the spear B against the fence, and thus gives an elastic stroke, in connection with the spring yet to be described. This fork A, and the pin or cross-bar D, are cast in the same piece, and the end of the spear B, has a notch in which this cross-bar rests, as seen at D, Fig. 2; and the ends of this cross-bar are cast with a catch, D', to hold the yoke E in place on the cross-bar D, the yoke being provided with a hole, E, shaped like the catch D, so as to allow the yoke to be put upon the end of the cross-bar, after which the yoke is turned so that it can not be got off by the animal. This fork A is provided with spikes F, in the usual manner. The guard G is cast with holes for the passage of the points of the spikes F, and it is fastened in place by means of a notch upon the top of the spear B, and a single bolt, H, which also holds the plate-spring I. The plate-spring I is very cheaply made, and the fork A and guard G require only two bolts, and no expensive finishing. Therefore I have a very cheap and yet a durable poke.

Having fully described my invention, I claim—

The above described poke, consisting of the fork A provided with the cross-bar D and the spikes F, and pivoted to the spear B, in combination with the guard G, plate-spring I, and yoke E, all arranged substantially as set forth.

CURTIS HINMAN.

Witnesses:
 DANIEL BREED,
 JOHN MEMMER.